United States Patent [19]

Tamagaki

[11] Patent Number: 4,760,609

[45] Date of Patent: Jul. 26, 1988

[54] READING APPARATUS

[75] Inventor: Akira Tamagaki, Kyoto, Japan

[73] Assignee: Sharp Kabushiki Kaisha, Osaka, Japan

[21] Appl. No.: 102,761

[22] Filed: Sep. 24, 1987

Related U.S. Application Data

[63] Continuation of Ser. No. 720,713, Apr. 8, 1985, abandoned.

[30] Foreign Application Priority Data

Apr. 11, 1984 [JP] Japan .................................. 59-73561

[51] Int. Cl.$^4$ ........................... G06K 7/10; G06K 9/20
[52] U.S. Cl. ...................................... 382/65; 250/205; 250/238; 235/455; 315/117; 355/57; 355/69; 382/53
[58] Field of Search ................ 235/455; 250/205, 238; 315/117; 355/37, 69; 358/213; 382/50, 52, 53, 65

[56] References Cited

U.S. PATENT DOCUMENTS

| | | | |
|---|---|---|---|
| 3,944,979 | 3/1976 | Kwok | 382/50 |
| 4,101,807 | 7/1978 | Hill | 355/69 |
| 4,320,964 | 3/1982 | Ishida et al. | 355/69 |
| 4,375,331 | 3/1983 | Tohyama et al. | 355/67 |
| 4,406,996 | 9/1983 | Oka | 250/205 |
| 4,533,854 | 8/1985 | Northrup | 250/205 |
| 4,551,760 | 11/1985 | Bendell | 358/213 |
| 4,565,441 | 1/1986 | Evans et al. | 355/37 |
| 4,585,339 | 4/1986 | Senoo | 355/69 |

Primary Examiner—Leo H. Boudreau
Assistant Examiner—Jose L. Couso
Attorney, Agent, or Firm—Birch, Stewart, Kolasch & Birch

[57] ABSTRACT

A reading apparatus for photoelectrically reading an original includes a light source unit having at least one fluorescent lamp, a CCD sensor for receiving a light which has been generated from the fluorescent lamp and reflected on the original, a monitor for monitoring an output signal from the CCD sensor, and a controller for controlling the CCD output signal to be at a predetermined level by changing the electric power supplied to the fluorescent lamp, thereby maintaining the fluorescent lamp at a predetermined temperature.

13 Claims, 4 Drawing Sheets

READING APPARATUS

This application is a continuation of application Ser. No. 720,713 filed on Apr. 8, 1985, now abandoned.

BACKGROUND OF THE INVENTION

1. Field of the Invention

The present invention relates to a photoelectric reading apparatus for reading an image of an original using a light source that projects light onto the original. The light source can be defined by three lamps of different colors, e.g., red, green and blue, for reading the image in colors or a single lamp for reading the image in monochrome.

2. Description of the Prior Art

The reading apparatus is used, for example, in a facsimile machine or copying machine in which the original is scanned across the reading apparatus.

In a prior art reading apparatus, the reading apparatus includes a light source, such as one or a plurality of fluorescent lamps, for producing a ribbon of light, a scanner for scanning the original across the ribbon of light, a single array of CCD sensor, and an optical system for directing the ribbon of light reflected on the original onto the CCD sensor.

The prior art reading apparatuses of the above described type have a problem in poor image reading due to the temperature characteristics of the fluorescent lamp, as explained below.

The fluorescent lamp has such temperature characteristics that: (i) the intensity of light generated from the fluorescent lamp alters depending on the temperature of the atmosphere surrounding the fluorescent lamp; and (ii) the intensity of light generated from the fluorescent lamp alters depending on the temperature of the inner wall of the fluorescent lamp tube. Thus, a problem arises such that the amount of light impinging on the original is insufficient or gradually changes during the image reading. This results in a low output signal or gradually changing output signal from the CCD sensor.

Referring to FIG. 1, a relationship between the intensity of light generated from the fluorescent lamp and the temperature of the lamp tube wall is shown. As shown in FIG. 1, the light intensity is at a peak point when the temperature of the wall is about 40° C. to 50° C., and the light intensity gradually decreases both when the temperature decreases or when the temperature increases.

FIG. 2a shows a relationship between the CCD output power and different colors obtained under 10° C. Similarly, FIG. 2b shows the same relationship, but obtained under 40° C. In both graphs, the shaded areas show the amount of noise signal contained in the output power. When these two graphs are compared, the SN ratio of output power under 10° C. is much greater than that under 40° C., and therefore, the image reproduced using the CCD sensor output under 10° C. will be very poor, when it is compared with the image reproduced using the CCD sensor output under 40° C. Therefore, the image reading should be carried out when the light intensity of the emitted light from the fluorescent lamp is at or around its peak point.

Referring to FIG. 3, a relationship between the CCD output power and the time in which the fluorescent lamp is turned on, obtained during the color original reading and under the condition that the atmospheric temperature is 20° C., is shown. In FIG. 3, the gradual increase of the CCD output power relative to the time is due to the gradual temperature increase of the tube wall of the fluorescent lamp.

Generally, as shown in FIG. 4, when reading the original in colors, three fluorescent lamps, such as red, green and blue, are lit sequentially by three control signals R, G and B. After three lamps are lit, a non-lighting period is provided for data transfer. Thus, each control signal has a duty cycle of 25%.

As understood from FIG. 3, even with the same original, the output data from the CCD sensor obtained immediately after the turning on of the light source differs from that obtained a few minutes after turning on of the light source. Such a difference results not only in the low contrast image but also in an unbalanced color image.

SUMMARY OF THE INVENTION

The present invention has been developed with a view to substantially solving the above described disadvantages and has for its essential object to provide an improved image reading apparatus in which the temperature of the tube wall of the fluorescent lamp or lamps can be maintained constant about between 40° C. to 50° C. every time the image reading operation is carried out.

It is also an essential object of the present invention to provide an image reading apparatus of the above described type which has a control system to monitor the tube wall temperature and maintain it to the desired temperature by the control of turning the light source on and off.

It is a further object of the present invention to provide an image reading apparatus of the above described type which has a heating device for promoting the temperature control, particularly for aiding the heat-up operation.

It is a further object of the present invention to provide an image reading apparatus of the above described type which has a cooling device for promoting the temperature control, particularly for aiding the cooling operation.

In accomplishing these and other objects, an image reading apparatus for photoelectrically reading an original includes a light source unit having at least one fluorescent lamp, a CCD sensor for receiving a light which has been generated from the fluorescent lamp and reflected on the original, a monitor for monitoring an output signal from the CCD sensor, and a controller for controlling the CCD output signal to be at a predetermined level by changing the electric power supplied to the fluorescent lamp, thereby maintaining the temperature of the fluorescent lamp at a predetermined degree.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which.

DESCRIPTION OF THE PREFERRED EMBODIMENTS

Figure 5:
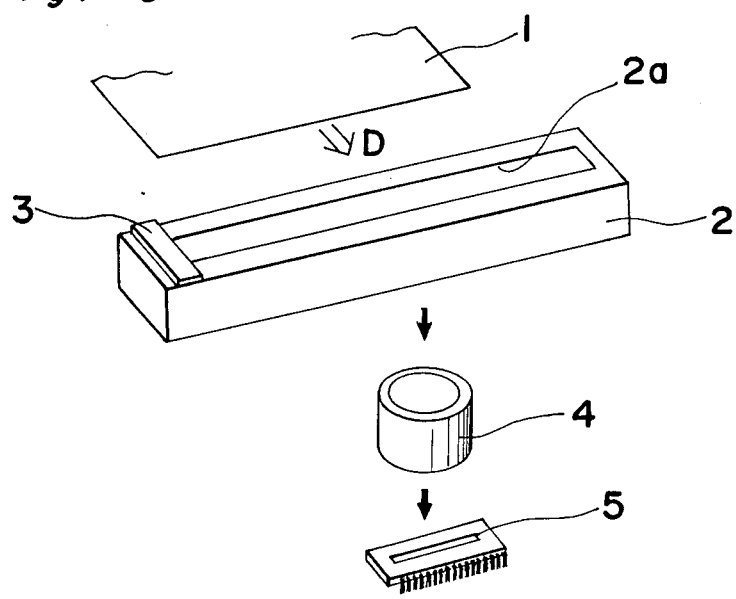
FIG. 5 is a diagrammatic view showing an arrangement of an image reading apparatus according to the present invention.

Referring to FIG. 5, a diagrammatic view of an image reading apparatus according to the present invention is shown. A fluorescent lamp unit 2 generates a ribbon of light which is directed to a slit 2a formed in unit 2. An original 1 scans in the direction D so as to move across slit 2a. The ribbon of light reflected on the original is directed through a lens arrangement 4 to a CCD sensor 5. A white reflector 3 is provided which covers one end of slit 2a for the white adjustment.

Figure 6A:
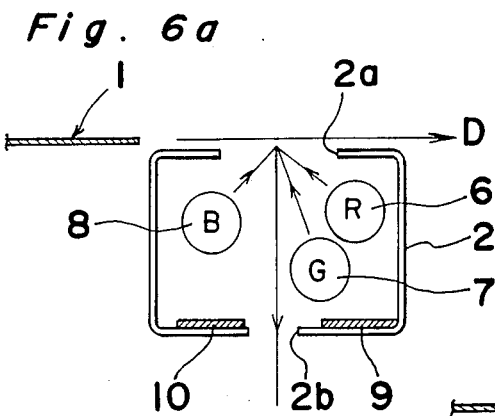
FIG. 6a is a cross-sectional view of a light source according to the present invention.

Referring to FIG. 6a, a cross-sectional view of fluorescent lamp unit 2 is shown. By a suitable scanner (not shown) original 1 moves immediately above slit 2a in the direction D. Three fluorescent lamps 6, 7 and 8 of red, green and blue are provided inside lamp unit 2. Unit 2 further has a slit 2b, formed parallel to slit 2a, in the bottom wall thereof, and heating means, such as heaters 9 and 10 supported on the bottom wall adjacent slit 2b. The ribbon of light reflected on original 1 directs downwardly through slit 2b to lens arrangement 4 and further to CCD sensor 5.

Figure 7:
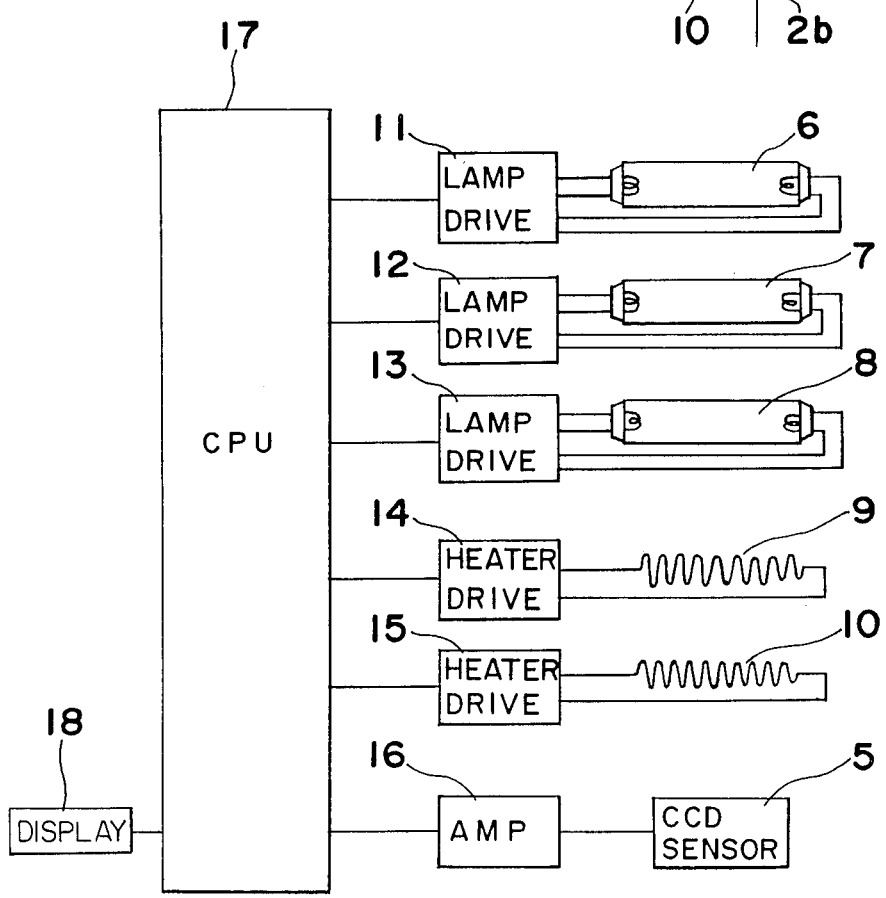
FIG. 7 is a block diagram showing an arrangement of an electric control part according to the present invention.

Referring to FIG. 7, a block diagram for controlling the fluorescent lamps, heaters and CCD sensor is shown. Three fluorescent lamps 6, 7, and 8 are connected respectively to lamp drive circuits 11, 12 and 13, which are further connected to a CPU 17. Two heaters 9 and 10 are connected respectively to heater drive circuits 14 and 15, which are connected to CPU 17. CCD sensor 5 is connected to an amplifier 16 and further to CPU 17. In the case of a monochrome image reading apparatus, one fluorescent lamp is sufficient.

Figure 8:
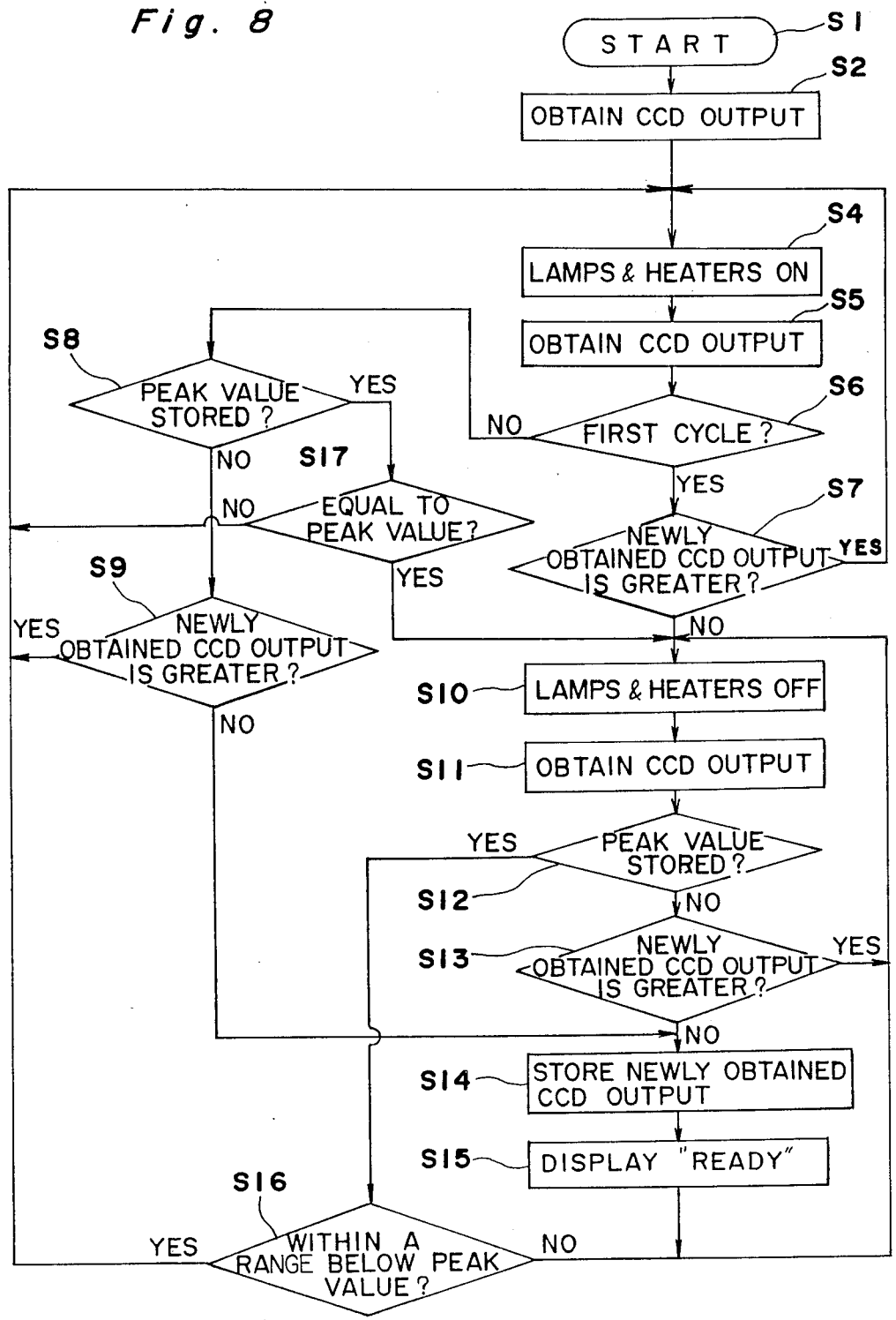
FIG. 8 is a flow chart showing an operation of a CPU shown in FIG. 7.

Next, the operation of the circuit shown in FIG. 7 will be described in connection with a flow chart shown in FIG. 8.

At step S1, a power switch (not shown) of the image reading apparatus is turned on, thereby starting the operation. Then, at step S2, one of the fluorescent lamps, such as red lamp 6, is lit with a duty ratio of 25%. The ribbon of light generated from lamp 6 is directed to slit 2a, and is partially reflected at white reflector 3. The light reflected at reflector 3 is directed to one end portion of CCD sensor 5 for obtaining a first white level signal, representing the light intensity. Here, the adjectives "first", "second", etc. are added merely to distinguish the white level signals obtained at different times. The obtained first white level signal is stored in the CPU. Then, the program goes to step S4 at which CPU 17 actuates lamp drive circuits 11, 12 and 13, thereby turning all lamps 6, 7 and 8 on with a duty ratio of 100%. Also, at step S4, CPU 17 actuates heater drive circuits 14 and 15, thereby turning heaters 9 and 10 on. In this manner the tube walls of the fluorescent lamps are heated to increase the temperature thereof.

After a predetermined period of time, at step S5, the same one fluorescent lamp, which is red lamp 6, is lit again with a duty ratio of 25%, and other lamps 7 and 8 are turned off, so as to obtain a second white level signal, which is also stored in the CPU. Then, at step S6, it is detected whether the operation is in the first cycle, or not. Since the operation is in the first cycle, the program goes to step S7 at which the first and second white level signals are compared.

Figure 1:
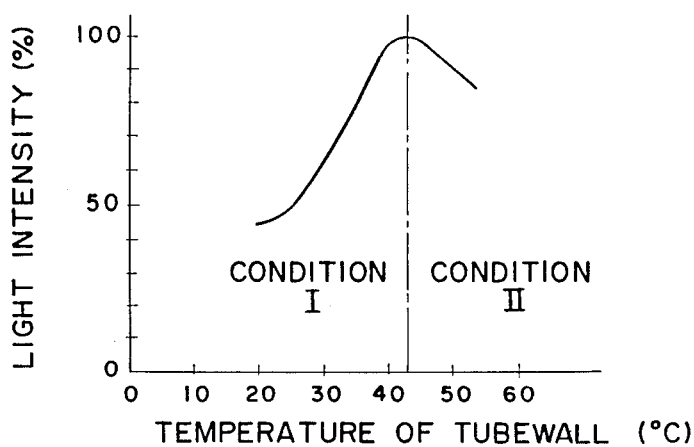
FIG. 1 is a graph showing a relationship between the intensity of light generated from the fluorescent lamp and the temperature of the lamp tube wall.
Figure 2A:
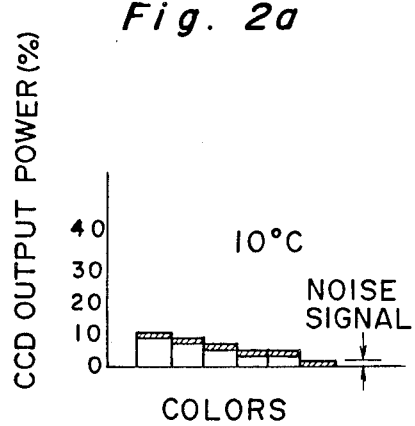
FIGS. 2a and 2b show a relationship between the CCD output power and different colors obtained under 10° C. and under 40° C., respectively.
Figure 2B:
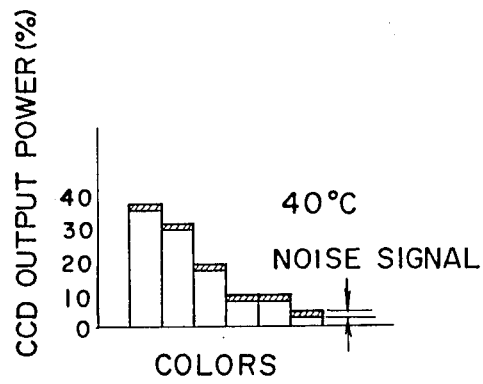
Figure 3:
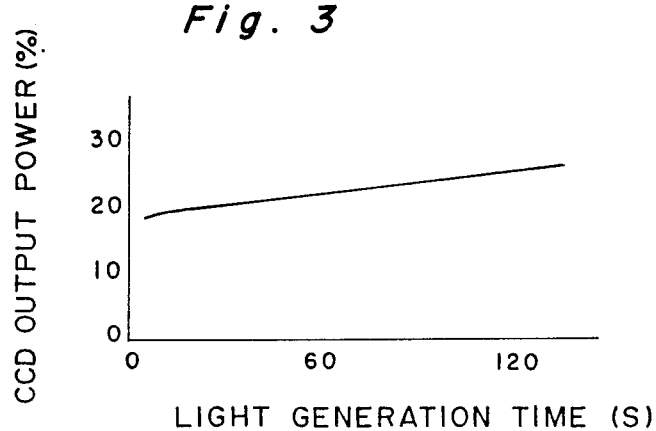
FIG. 3 shows a relationship between the CCD output power and the time in which the fluorescent lamp is turned on, obtained during the color original reading and under the condition that the atmospheric temperature is 20° C.
Figure 4:
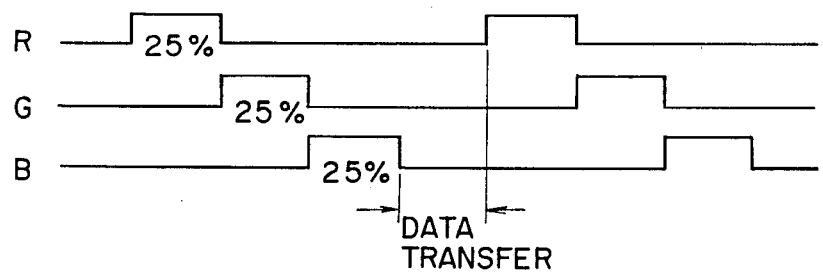
FIG. 4 shows waveforms for controlling the power supply to the red, green and blue fluorescent lamps for lighting the original.

In the case where the second white level signal is greater than the first white level signal, it is understood that the light intensity has increased with respect to the temperature increase of the tube wall during step S5. This implies that the fluorescent lamps are in a condition I (FIG. 1), which is identical to a region on the left-hand side to the peak point of characteristic curve.

On the contrary, if the second white level signal is less than the first level signal, it is understood that the light intensity has decreased with respect to the temperature increase of the tube wall during step S5. This implies that the fluorescent lamps are in a condition II (FIG. 1), which is identical to a region on the right-hand side to the peak point of characteristic curve.

Usually, the fluorescent lamps are initially in condition I, but it is possible that they may be in condition II, such as in the case where the image reading apparatus is turned on again immediately after a long period of use.

When the result of the comparison at step S7 implies that the fluorescent lamps are in condition I, the program returns to step S4. Accordingly, all the fluorescent lamps are maintained on with 100% duty ratio and heaters 9 and 10 are also maintained on. Then, at step S5, a third white level signal is obtained and stored, in a similar manner as described above. At step S6, since the operation is in the second cycle, the program goes to step S8, at which it is detected whether a peak value of the white level signal is stored or not. At this stage, since no peak value is stored, the program goes to step S9, at which the second and third white level signals are compared with each other.

If the third white level signal is greater than the second white level signal, it is understood that the light intensity is still increasing with respect to the temperature increase of the tube wall during step S5 in the second cycle operation. Thus, it is understood that the fluorescent lamps are still in condition I.

If the case is to the contrary, it is understood that the light intensity is now decreasing with respect to the temperature increase of the tube wall during step S5 in the second cycle operation. Thus, it is understood that the light intensity has just passed the peak point and the fluorescent lamps are now in condition II.

Until the fluorescent lamps acquire condition II, the program repeats steps S9-S4-S5-S6-S8-S9 again and again. When it is detected at step S9 that the light intensity has just passed the peak point and the fluorescent lamps enter into condition II, the program goes to step S14.

Returning back to step S7, when it is detected that the fluorescent lamps are in condition II, the program goes from step S7 to step S10, at which the fluorescent lamps and heaters are turned off for cooling the tube walls of the fluorescent lamps. Then, after a predetermined period of time, a fourth white level signal is obtained from CCD sensor 5 in a similar manner described above. At step S12, it is detected whether a peak value of the white level signal is stored or not. Since no peak value is stored at this stage, the program goes to step S13, at which the third and fourth white level signals are compared with each other.

If the fourth white level signal is greater than the third white level signal, it is understood that the light intensity is increasing with respect to the temperature decrease of the tube wall. Thus, it is understood that the fluorescent lamps are in condition II and the white level signal is changing towards the peak value. In this case, the program returns from step S13 to step S10 for the further cooling operation.

If the fourth white level signal is less than the third white level signal, it is understood that the light intensity is decreasing with respect to the temperature decrease of the tube wall. Thus, it is understood that the light intensity has just passed the peak point and the fluorescent lamps are now in condition I. In this case, the program advances from step S13 to step S14.

Until the fluorescent lamps acquire condition I, the program repeats steps S13-S10-S11-S12-S13 again and again. When it is detected at step S9 that the light intensity has just passed the peak point and the fluorescent lamps enter into condition I, the program goes to step S14.

At step S14, as progressed from step S9 or step S13, the white level signal obtained most recently is stored as representing the peak value. Then, the program goes to step S15 for effecting the indication of ready to read through a suitable display device 18.

Then, the program returns to step S10 thereby turning the fluorescent lamps and heaters off. By all means, when the reading procedure for reading the original starts, the fluorescent lamps are turned on with 25% duty cycle as controlled by a different flow chart (not shown). After a predetermined period of time, the program goes from step S10 to S11 so as to obtain a fifth white level signal which is compared with the stored peak value which is identical to the fourth white level signal. The obtained difference is stored in CPU 17. Since the peak value is already obtained and stored in CPU 17, the program advances through step S12 to step S16. At step S16, it is detected whether or not the obtained difference is less than a predetermined amount. If the difference is less than the predetermined amount, it is understood that the temperature of the fluorescent lamps has not cooled down to an undesirable low temperature. Thus, while the white level signal is within a predetermined range below the peak value, that is while the temperature of the fluorescent lamps are within a predetermined range below the desired temperature, the program repeats steps S16-S10-S11-S12-S16 again and again.

At step S16, when it is detected that the white level signal produced from the CCD sensor is less than a predetermined level, which is below the peak value by said predetermined range, the program advances from step S16 to S4, at which the lamps are all turned on at a 100% duty cycle and the heaters are also turned on. Then, after a predetermined period of time, at step S5, a sixth white level signal is obtained. Then, the program advances through step S6 to step S8, at which it is detected whether a peak value is stored or not. Since the peak value is being stored in CPU 17, the program advances to step S17, at which it is detected whether or not the obtained sixth white level signal is equal to the stored peak value or not. Until the newly obtained white level signal reaches the stored peak value, the program carries out steps S17-S4-S5-S6-S8-S17 repeatedly.

When it is detected at step S17 that the newly obtained white level signal is equal to the stored peak value, the program advances from step S17 to step S10, thereby turning off the fluorescent lamps and heaters. Then, the program repeats steps S16-S10-S11-S12-S16 again and again, in the same manner described above.

In the above described manner, the white level signal is maintained to the peak value, or within a predetermined ranged from the peak value.

Figure 9:
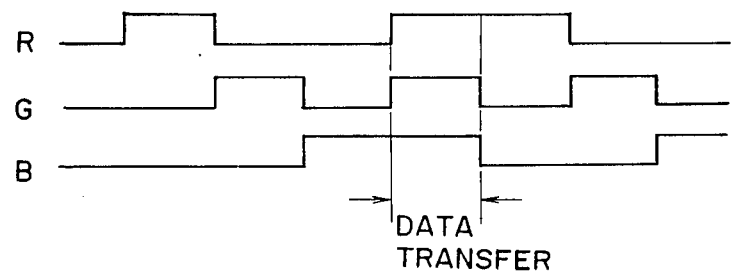
FIG. 9 shows waveforms for controlling the power supply to the red, green and blue fluorescent lamps for lighting the original and also for maintaining the desired temperature of the light source.

It is to be noted that the fluorescent lamps may be turned on for the purpose of heating the lamps anytime when the reading operation is not carried out. During the reading operation, the lamps may be turned on for the purpose of heating the lamps in the data transfer period, as indicated in FIG. 9.

In the above described embodiment, the heating of the fluorescent lamps is effected by the fluorescent lamps themselves with the aid of heaters. However, it is possible that the heating may be done solely by the fluorescent lamps or by the heaters.

Figure 6B:
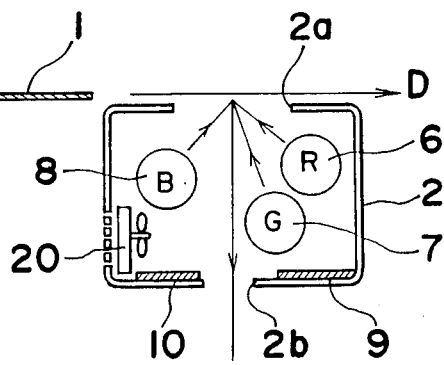
FIG. 6b is a view similar to FIG. 6a, but particularly showing a modification thereof.

Furthermore, in the case where the reading apparatus is used in a comparatively warm or hot place, such as where the room temperature is above 40° C., the fluorescent lamps may easily become hot, such as above 50° C. In such a case, it is preferable to provide a suitable cooling means, such as a fan 20 shown in FIG. 6b.

In the above described embodiment, the ready signal is indicated at step S15 only when the white level signal has reached the peak point. However, in the case where the room temperature is very cold, such as 0 to 10° C., it takes a long time before the fluorescent lamps warm up to the desired temperature. In such a case, it is possible to produce the ready signal when the white level signal has reached a certain high percent, such as 70%, of the peak level. If the reading operation is started with the white level signal being at 70% of the peak value, this 70% level is maintained during the reading of one original by storing the 70% level signal in CPU 17 in place of the peak value. Accordingly, the contrast of the reproduced image can be maintained uniform within one original.

In the above described embodiment, three fluorescent lamps are provided for enabling the reading in colors. The present invention can be accomplished by using only one fluorescent lamp in which the original is read in monochrome.

According to the present invention, since the fluorescent lamps are maintained at a constant temperature every time the reading is required, the image read by the reading apparatus will have a high quality regardless of the change in room temperature, or undesirable change in the condition of the fluorescent lamps themselves, the CCD sensor or amplifier.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of the appended claims.

What is claimed is:

1. A reading apparatus for photoelectrically reading an original, comprising:
   a light source unit positioned adjacent said original, said light source unit including,
   at least one fluorescent lamp,
   an auxiliary temperature control source positioned adjacent said at least one fluorescent lamp,
   a first opening formed in said light source unit in a confronting relationship with said original, said first opening including a white reflector means for reflecting light from said at least one fluorescent lamp, and
   a second opening formed opposite said first opening, whereby light reflected by said reflector means passes through said second opening;
   sensor means for receiving and measuring an amount of light reflected through said second opening, said sensor means generating an output signal according to said measured amount of reflected light from said reflector means;
   means for periodically monitoring said output signal from said sensor means; and
   control means, responsive to said means for periodically monitoring, for maintaining said output signal at a predetermined level by selectively controlling a supply of electric power to both of said at least one fluorescent lamp and said auxiliary temperature control source.

2. A reading apparatus according to claim 1, wherein said light source unit includes three fluorescent lamps for generating red, green and blue light, respectively.

3. A reading apparatus according to claim 1, wherein said auxiliary temperature control source includes heating means provided adjacent said at least one fluorescent lamp, and wherein said control means changes the electric power supply to said heating means.

4. A reading apparatus according to claim 3, wherein said auxiliary temperature control source further includes a cooling means provided adjacent said at least one fluorescent lamp, and wherein said control means changes the electric power supply to said cooling means.

5. A reading apparatus according to claim 1, wherein said sensor means is a CCD, and said output signal is a white level signal.

6. A reading apparatus according to claim 1, wherein said control means maintains said output signal at a peak value in response to selectively controlling said supply of electrical power.

7. A reading apparatus according to claim 1, wherein said control means maintains said output signal at a level within a predetermined range below a peak value in response to selectively controlling said supply of electrical power.

8. A reading apparatus according to claim 1, wherein said control means compares an output signal obtained in one cycle operation of said means for periodically monitoring with an output signal obtained in a subsequent cycle operation of said means for periodically monitoring.

9. A reading apparatus according to claim 1, further comprising display means for displaying a ready indication when said output signal is at said predetermined value.

10. A reading apparatus according to claim 1, further comprising a display means for displaying a ready indication when said output signal is at a predetermined percentage of said predetermined value.

11. A reading apparatus according to claim 10, wherein said predetermined percentage is 70%.

12. A reading apparatus according to claim 2, wherein each of said three fluorescent lamps are independently controlled by said control means to receive selected amounts of said supply of electric power.

13. A reading apparatus for photoelectrically reading an original, comprising:
    a light source unit positioned adjacent said original, said light source unit including,
    three fluorescent lamps for generating red, green and blue light, respectively,
    an auxiliary temperature control source positioned adjacent at least one of said three fluorescent lamps,
    a first opening formed in said light source unit in a confronting relationship with said original, said first opening including reflector means for reflecting light from each of said three fluorescent lamps, and
    a second opening formed opposite said first opening, whereby light reflected from said reflector means passes through said second opening;
    sensor means for receiving and measuring an amount of light reflected through said second opening, said sensor means generating an output signal according to said measured amount of reflected light from said reflector means;
    means for periodically monitoring said output signal from said sensor means; and
    control means, responsive to said means for periodically monitoring, for comparing an output signal obtained in one cycle operation of said means for periodically monitoring with an output signal obtained in a subsequent cycle operation of said means for periodically monitoring, said control means maintaining said output signal at a predetermined level by selectively controlling a supply of power to each of said three fluorescent lamps and said auxiliary temperature control source;
    said three fluorescent lamps being independently controlled by said control means to receive selected amounts of said supply of electric power.

* * * * *